June 19, 1923.  G. W. BUFFORD  1,458,973

TOOL HOLDER AND TOOL

Filed Aug. 2, 1919

WITNESS:
René Bruine

INVENTOR
George W. Bufford
By Attorneys,
Fraser, Turk & Myers

Patented June 19, 1923.

1,458,973

UNITED STATES PATENT OFFICE.

GEORGE W. BUFFORD, OF BUFFALO, NEW YORK, ASSIGNOR TO J. H. WILLIAMS & CO., OF BROOKLYN, NEW YORK, A CORPORATION OF NEW YORK.

TOOL HOLDER AND TOOL.

Application filed August 2, 1919. Serial No. 314,982.

*To all whom it may concern:*

Be it known that I, GEORGE W. BUFFORD, a citizen of the United States of America, residing in Buffalo, Erie County, State of New York, have invented certain new and useful Improvements in Tool Holders and Tools, of which the following is a specification.

This invention relates to a tool and holder therefor and aims to provide certain improvements therein.

The invention is particularly directed to that type of tool which is cut from a bar of metal, a holder of suitable construction being provided in which the tool is held.

It has heretofore been common to provide a holder adapted to receive a bar tool of rectangular or some non-circular cross-section, the tool being adapted to be inserted in the holder in one position only and to be held therein by some form of clamping mechanism. In this type of tool and holder the cutting face of the tool is adapted for practically only one type of work, and many different tools are hence required for different machine operations. A very serious drawback to this construction is that different metals operated upon require different clearance in the tool, so that for the same operation there are required many different tools, dependent upon the precise character of the metal of which the part is to be constructed. Because of the expense of obtaining a large stock of tools, the common practice is to regrind the tool for every different operation. This, of course, involves a great deal of waste in the tool steel, and very considerable time in grinding.

According to the present invention, I provide a tool of circular cross-section, and a tool holder capable of clamping it in any angular position. This not only fits a tool with a given cutting face for a number of different operations, but enables the same tool to be used on a wide diversity of metals, due to the fact that the clearance may be instantly adjusted to suit the metal upon which the operation is to be performed. The invention also includes other features of construction which will be hereinafter more fully described.

Referring to the drawings, which illustrate one form of the invention—

Figure 1:
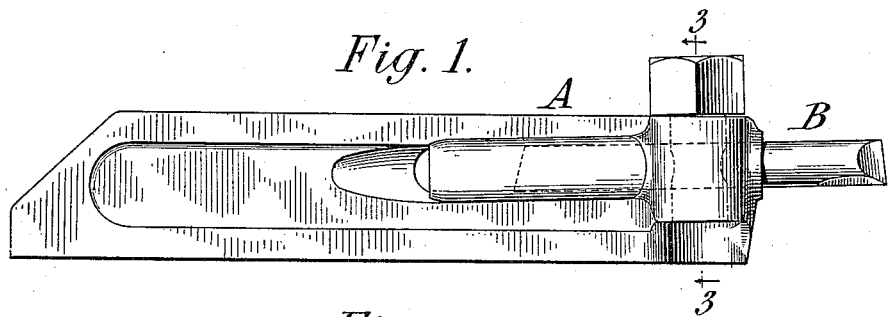
Figure 1 is a side elevation of the preferred form of tool and holder provided by my invention.

Referring to the drawings, let A indicate the tool holder and B the tool. The shank of the tool holder may be of conventional form; the head of the holder is provided with a cylindrical socket C which is adapted to receive the tool B. This socket extends longitudinally of the holder, or substantially so. Clamping means are provided for holding the tool B in fixed relation with the tool holder, such clamping means being shown as a cam D. It will be noted that the cam D has a groove E adapted to directly engage the body of the tool. The cam has an operating portion located at the top of the holder for convenient access, this being shown in the form of a polygonal head which may be engaged by a wrench to turn the cam.

Figure 2:
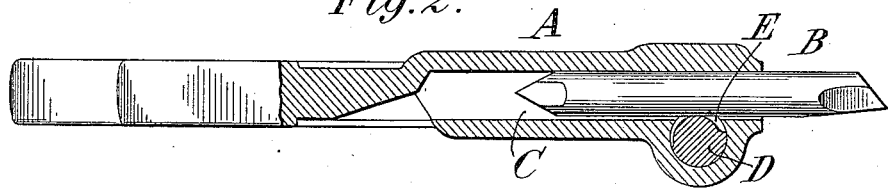
Fig. 2 is a longitudinal section partly in elevation.
Figure 3:
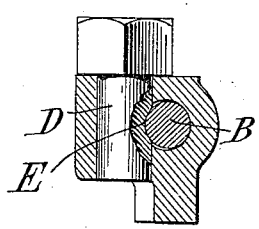
Fig. 3 is a cross-section on the line 3—3, Fig. 1.
Figure 4:
Figs. 4 to 11 are views more or less diagrammatic showing the application of the tool to different forms of work.
Figures 5, 6:
Figure 7:
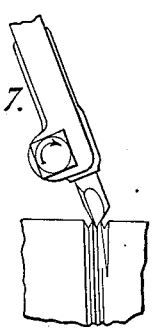
Figure 8:
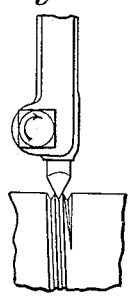
Figure 9:
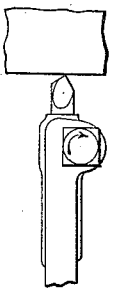
Figure 10:
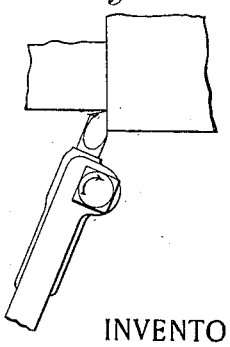
Figure 11:
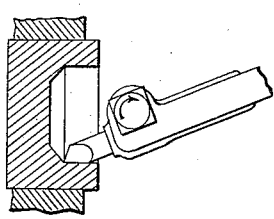

The precise cutting face on the tool may be variously shaped. In the tool shown in Fig. 2 both ends of the bar are provided with cutting faces. By reason of the circular contour of the tool stock, and the similarly formed socket in the tool holder with clamping means adapted to engage the tool in any angular position, it is possible to bring successive faces of the tool into operative position. Thus, in Figs. 5 and 6 there is illustrated the same tool used as a right and left hand side tool. Fig. 4 illustrates a diamond point tool used as a left hand side tool, with the tool holder in an angular position. Figs. 7 and 8 illustrate the diamond point tool used as a thread cutting tool in two different positions. Figs. 9, 10 and 11 illustrate the use of another form of diamond point tool used as a thread cutting tool, a right hand facing tool, and an inside facing tool, respectively.

An important feature of the invention is that in many of the operations which the same tool is called upon to perform, the different degrees of clearance required may be obtained by slight angular adjustments of the tool in the holder.

By this means a single tool will suffice for a large number of operations, and a single grinding will keep the tool in condition. As before stated, this obviates to a large extent the many grinding operations now performed and avoids considerable wastage in the tool steel.

I have found in practice that the best results are obtained by mounting the tool in the holder in a substantially horizontal position, or one which does not tilt materially upward. Preferably the tool extends in substantially axial alinement with the tool holder.

While I have shown and described several forms of the invention, it will be understood that I do not wish to be limited thereto as various changes may be made therein without departing from the invention.

What I claim is:—

1. The combination of a tool holder and a tool, the tool being circular in cross-section and the tool holder having a socket approximately conforming thereto, and a cam adapted to engage the tool at any point in its circumference, the cam having a curved face which is concaved to fit the side of the tool.

2. The combination with a tool holder of a bar tool of circular cross-section throughout and a vertically arranged cam for holding the tool at any point on its circumference, the cam having a face which is curved to fit the circular side of the tool.

In witness whereof, I have hereunto signed my name.

GEORGE W. BUFFORD.